(12) United States Patent
Matsuyuki et al.

(10) Patent No.: US 10,071,539 B2
(45) Date of Patent: Sep. 11, 2018

(54) CO-SINTERED CERAMIC FOR ELECTRONIC DEVICES

(71) Applicant: Apple Inc., Cupertino, CA (US)

(72) Inventors: Naoto Matsuyuki, Tokyo-to (JP);
Trevor J. Ness, Cupertino, CA (US);
David I. Nazzaro, Groveland, MA (US)

(73) Assignee: APPLE INC., Cupertino, CA (US)

( * ) Notice: Subject to any disclaimer, the term of this patent is extended or adjusted under 35 U.S.C. 154(b) by 150 days.

(21) Appl. No.: 14/864,618

(22) Filed: Sep. 24, 2015

(65) Prior Publication Data

US 2016/0090326 A1 Mar. 31, 2016

Related U.S. Application Data

(60) Provisional application No. 62/057,766, filed on Sep. 30, 2014.

(51) Int. Cl.
| | | |
|---|---|---|
| *H04M 1/02* | (2006.01) | |
| *B32B 18/00* | (2006.01) | |
| *B28B 1/00* | (2006.01) | |
| *C04B 35/645* | (2006.01) | |
| *B28B 7/00* | (2006.01) | |

(52) U.S. Cl.
CPC ............. *B32B 18/00* (2013.01); *B28B 1/002* (2013.01); *B28B 1/008* (2013.01); *B28B 7/0088* (2013.01); *C04B 35/645* (2013.01); *H04M 1/0202* (2013.01); *C04B 2235/602* (2013.01); *C04B 2235/6022* (2013.01); *C04B 2235/6023* (2013.01); *C04B 2235/9615* (2013.01); *C04B 2237/343* (2013.01); *C04B 2237/348* (2013.01); *H04M 1/0266* (2013.01)

(58) Field of Classification Search
CPC ..... B32B 18/00; H04M 1/026; H04M 1/0202; H04M 1/0266; H05K 5/003
See application file for complete search history.

(56) References Cited

U.S. PATENT DOCUMENTS

| | | |
|---|---|---|
| 1,675,910 A | 7/1928 | Riker |
| 2,210,094 A | 8/1940 | Mueller |
| 2,420,989 A | 5/1947 | Waldron |
| | (Continued) | |

FOREIGN PATENT DOCUMENTS

| | | |
|---|---|---|
| CN | 201022205 | 2/2008 |
| CN | 201248054 | 5/2009 |
| | (Continued) | |

OTHER PUBLICATIONS

Author Unknown, "Laboratory Instruments," http://www.mocon.com, 2 pages, at least as early as Oct. 12, 2012.

(Continued)

*Primary Examiner* — Margaret G Moore
(74) *Attorney, Agent, or Firm* — Dorsey & Whitney LLP

(57) ABSTRACT

A ceramic structure and methods for making the ceramic structure are disclosed. Multiple parts may be molded; the parts may be molded from the same or different ceramic materials. The parts may be formed in the same mold and may be adjacent to and/or attached to one another as a result of molding. The parts may be placed in a sintering furnace and sintered simultaneously. Simultaneously sintering the parts forms a unitary structure from the parts.

21 Claims, 6 Drawing Sheets

(56) References Cited

U.S. PATENT DOCUMENTS

| | | |
|---|---|---|
| 2,728,929 A | 1/1956 | Bell |
| 2,859,510 A | 11/1958 | Baxa |
| 2,909,281 A | 10/1959 | Koskinen |
| 3,012,384 A | 12/1961 | Brown et al. |
| 3,123,910 A | 3/1964 | Neilson |
| 3,202,561 A | 8/1965 | Swanson et al. |
| 3,290,832 A | 12/1966 | Highberg et al. |
| 3,346,904 A | 10/1967 | Armstrong |
| 3,696,563 A | 10/1972 | Rands |
| 4,038,783 A | 8/1977 | Rosenthal |
| 4,111,029 A | 9/1978 | Dulaquais |
| 4,164,704 A | 8/1979 | Kato et al. |
| 4,232,928 A | 11/1980 | Wickersham |
| 4,445,300 A | 5/1984 | Sekiya et al. |
| 4,552,800 A * | 11/1985 | Blasch ............... B22F 3/222 |
| | | 428/212 |
| 4,584,799 A | 4/1986 | Juvet |
| 4,594,814 A | 6/1986 | Olszewski et al. |
| 4,753,918 A | 6/1988 | Cyron |
| 4,911,796 A | 3/1990 | Reed |
| 4,945,687 A | 8/1990 | Scheider et al. |
| 5,021,213 A | 6/1991 | Nishio et al. |
| 5,028,075 A | 7/1991 | Donnelly |
| 5,083,401 A | 1/1992 | Yamashita et al. |
| 5,144,536 A | 9/1992 | Tsukada et al. |
| 5,217,335 A | 6/1993 | Houchens, Jr. et al. |
| 5,276,999 A | 1/1994 | Bando |
| 5,280,819 A | 1/1994 | Newkirk et al. |
| 5,329,735 A | 7/1994 | Charlton et al. |
| 5,353,463 A | 10/1994 | Bracy, Jr. |
| 5,590,387 A | 12/1996 | Schmidt et al. |
| 5,720,649 A | 2/1998 | Gerber et al. |
| 5,779,218 A | 7/1998 | Kowanz |
| 5,843,117 A | 12/1998 | Alt et al. |
| 5,953,989 A | 9/1999 | Uchiyama et al. |
| 6,087,191 A | 7/2000 | Boggs |
| 6,110,015 A | 8/2000 | Christianson et al. |
| 6,149,506 A | 11/2000 | Duescher |
| 6,183,347 B1 | 2/2001 | Shaw |
| 6,276,994 B1 | 8/2001 | Yoshida et al. |
| 6,406,769 B1 | 6/2002 | Delabre |
| 6,413,895 B1 | 7/2002 | Merkel et al. |
| 6,453,783 B2 | 9/2002 | Yu et al. |
| 6,464,080 B1 | 10/2002 | Morris et al. |
| 6,517,995 B1 | 2/2003 | Jacobson et al. |
| 6,717,738 B2 | 4/2004 | Yamada et al. |
| 6,811,136 B2 | 11/2004 | Eberhardt et al. |
| 7,122,057 B2 | 10/2006 | Beam et al. |
| 7,171,838 B2 | 2/2007 | Shiokawa |
| 7,540,697 B2 | 6/2009 | Wang et al. |
| 7,582,175 B2 | 9/2009 | Trejo-Rincon |
| 7,597,483 B2 | 10/2009 | Simmons et al. |
| 7,685,676 B2 | 3/2010 | McClellan |
| 7,724,532 B2 | 5/2010 | Zadesky et al. |
| 7,774,918 B2 | 8/2010 | Ainsworth |
| 8,015,852 B2 | 9/2011 | Su |
| 8,052,743 B2 | 11/2011 | Weber et al. |
| 8,066,251 B2 | 11/2011 | Brown |
| 8,157,936 B2 * | 4/2012 | Tsuzuki ............... B28B 1/008 |
| | | 156/89.12 |
| 8,252,379 B2 | 8/2012 | Nagashima |
| 8,295,902 B2 | 10/2012 | Salahieh et al. |
| 8,439,947 B2 | 5/2013 | Howard et al. |
| 8,454,705 B2 | 6/2013 | Pressacco et al. |
| 8,460,060 B2 | 6/2013 | Wilson et al. |
| 8,530,847 B2 | 9/2013 | Frank et al. |
| 8,564,961 B2 | 10/2013 | Weber |
| 8,568,551 B2 | 10/2013 | Brennan et al. |
| 8,597,078 B2 | 12/2013 | Wilson et al. |
| 8,601,849 B2 | 12/2013 | Luo et al. |
| 8,703,040 B2 | 4/2014 | Liufi et al. |
| 8,733,422 B2 | 5/2014 | Browning et al. |
| 8,738,104 B2 | 5/2014 | Yeates |
| 8,994,608 B2 | 3/2015 | Russell-Clarke et al. |
| 9,132,510 B2 | 9/2015 | Russell-Clarke et al. |
| 9,221,289 B2 | 12/2015 | Prest et al. |
| 9,284,228 B2 | 3/2016 | Nahas et al. |
| 2005/0064345 A1 | 3/2005 | Oyake |
| 2006/0008616 A1 | 1/2006 | Dean et al. |
| 2006/0097127 A1 | 5/2006 | Firth |
| 2006/0162849 A1 | 7/2006 | Han |
| 2007/0019395 A1 * | 1/2007 | Yeh ............... G01D 11/28 |
| | | 362/23.18 |
| 2007/0039691 A1 | 2/2007 | Mroz |
| 2008/0206509 A1 | 8/2008 | Kent et al. |
| 2008/0257006 A1 | 10/2008 | Durney et al. |
| 2008/0312727 A1 | 12/2008 | Blank |
| 2009/0014118 A1 | 1/2009 | Ratcliffe |
| 2009/0043228 A1 | 2/2009 | Northrop et al. |
| 2010/0285248 A1 * | 11/2010 | Zhu ............... H04M 1/0283 |
| | | 428/34.1 |
| 2011/0041553 A1 | 2/2011 | Xiong et al. |
| 2011/0156361 A1 | 6/2011 | Ghalambor et al. |
| 2011/0267773 A1 | 11/2011 | MacFarlane |
| 2012/0212890 A1 | 8/2012 | Hoshino et al. |
| 2013/0216740 A1 | 8/2013 | Russell-Clarke et al. |
| 2013/0251934 A1 | 9/2013 | Caracciolo et al. |
| 2013/0318766 A1 | 12/2013 | Kiple et al. |
| 2014/0076731 A1 | 3/2014 | Russell-Clarke et al. |
| 2014/0082926 A1 | 3/2014 | Tam et al. |
| 2014/0102162 A1 | 4/2014 | Morgenstern et al. |
| 2014/0106129 A1 | 4/2014 | Teshima et al. |
| 2015/0214600 A1 * | 7/2015 | Golko ............... G06F 1/1698 |
| | | 343/702 |
| 2015/0273524 A1 | 10/2015 | Ely et al. |
| 2015/0289395 A1 | 10/2015 | Van Asseldonk et al. |
| 2015/0374397 A1 | 12/2015 | Brannon |
| 2016/0089811 A1 | 3/2016 | Matsuyuki et al. |
| 2016/0255929 A1 * | 9/2016 | Nazzaro ............... A45C 11/00 |
| 2016/0256979 A1 | 9/2016 | Matsuyuki et al. |
| 2017/0060193 A1 | 3/2017 | Franklin et al. |
| 2017/0304032 A1 | 10/2017 | Jung et al. |

FOREIGN PATENT DOCUMENTS

| | | |
|---|---|---|
| CN | 101693629 | 4/2010 |
| CN | 101877951 | 11/2010 |
| CN | 201940834 | 8/2011 |
| CN | 102316179 | 1/2012 |
| CN | 102695966 | 9/2012 |
| CN | 202720538 | 2/2013 |
| CN | 202872871 | 4/2013 |
| CN | 203191877 | 9/2013 |
| CN | 203492064 | 3/2014 |
| CN | 103864452 | 6/2014 |
| CN | 103873619 | 6/2014 |
| CN | 103951420 | 7/2014 |
| JP | 60244493 | 12/1985 |
| JP | 200061745 | 2/2000 |
| KR | 1020080103031 | 11/2008 |
| WO | WO03/002289 | 1/2003 |
| WO | WO2012/007755 | 1/2012 |
| WO | WO2013/093822 | 6/2013 |

OTHER PUBLICATIONS

Author Unknown, "Stewmac Inlay Tools and Materials," http://web.archirve.org/...op/Inlay,_pearl/Tools_and_supplies_for:_Inlay,_pearl_cutting/Carbide_Downcut_Inlay_Router_Bits.html, 5 pages, at least as early as Dec. 4, 2013.

* cited by examiner

CO-SINTERED CERAMIC FOR ELECTRONIC DEVICES

CROSS-REFERENCE TO RELATED APPLICATION

This application is a nonprovisional patent application of, and claims the benefit to, U.S. Provisional Patent Application No. 62/057,766, filed Sep. 30, 2014 and titled "Ceramic Double Sintering," the disclosure of which is hereby incorporated herein by reference in its entirety.

FIELD

Embodiments disclosed herein relate to ceramic parts for use in portable electronic devices. More particularly, embodiments relate to methods for machining ceramic parts before being completely sintered.

BACKGROUND

The use of ceramic materials in the manufacture of parts for portable electronic devices has increased as portable electronic devices become smaller and more durable. In general, there is a need for increased durability for components that form some electronic devices. It may be particularly advantageous to increase the durability while also maintaining or reducing the overall weight and size of the electronic device.

The relatively light weight of ceramic material in relation to its relatively high degree of hardness and scratch resistance weighs in favor of using ceramic parts for structural and/or protective components. Ceramics may also help the device meet consumer's demands for aesthetically pleasing and refined surface finishes.

However, some components used in portable electronic devices include various sizes and complex shapes. Different methods and processes may be utilized to form ceramic materials into housings and other parts for portable electronic devices. However, due to their very hard and durable properties, ceramic parts may be difficult to form with fine or precise features, particularly using traditional machining techniques.

SUMMARY

One embodiment may take the form of a method for manufacturing a ceramic component for a portable electronic device, comprising: forming a first part from a first ceramic material; forming a second part from a second ceramic material; and simultaneously sintering the first part and second part, thereby fusing the first part to the second part to form the ceramic component.

Another embodiment may take the form of a component for a portable electronic device, comprising: a first part formed from a first ceramic material having a first property; and a second part formed from a second ceramic material having a second property; wherein the first and second parts are fused together during sintering; and the first property is different from the second property.

Still another embodiment may take the form of a method for forming a co-sintered structure, comprising: molding, using first mold piece and a second mold piece, a first part from a first ceramic slurry; co-molding to the first part, using the first mold piece and a third mold piece, a second part from a second ceramic slurry; and co-sintering the first and second parts, thereby forming the co-sintered structure.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
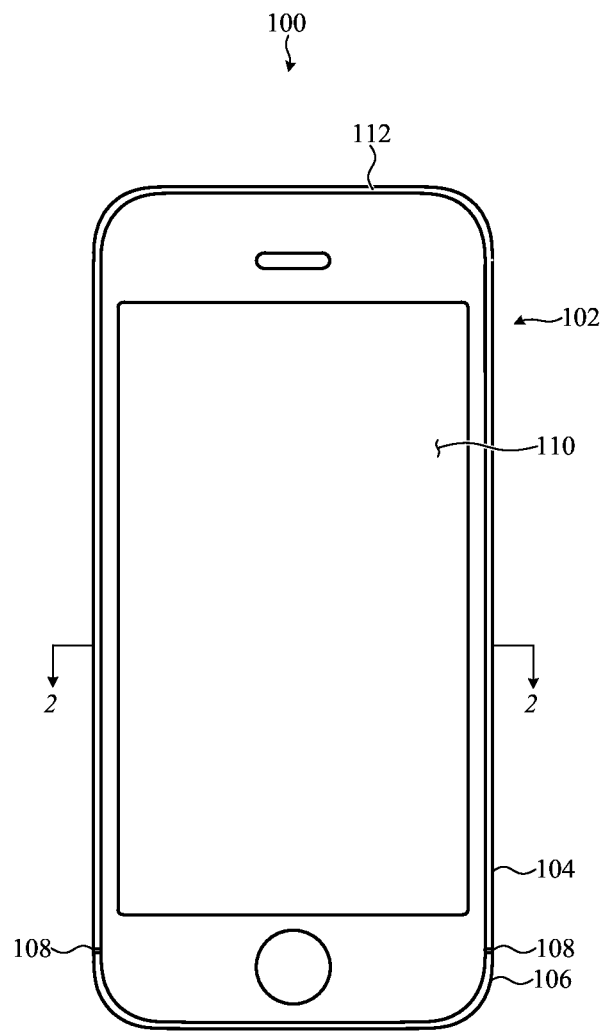
FIG. 1A depicts a sample electronic device having a housing at least partially formed as a co-sintered ceramic structure.

Reference will now be made in detail to representative embodiments illustrated in the accompanying drawings and in particular with reference to FIGS. 1-7. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Those skilled in the art will readily appreciate that the detailed description given herein with respect to these Figures is for explanatory purposes only and should not be construed as limiting. Like reference numerals denote like structure throughout each of the various figures.

A co-sintered structure may be formed from a first ceramic part and a second ceramic part (or simply, first and second parts). The first and second parts may be formed from different ceramic materials and may have different physical and/or chemical properties. For example, one part may be transparent while the other is opaque. As another example, one part may be formed from zirconia and another from alumina. As yet another example, one part may be a first color ceramic and a second part may be a second color ceramic.

The first and second parts may be molded such that they are affixed to and/or abutting one another, and then simultaneously sintered to fuse the parts together. By sintering the first and second parts together, boundaries, seams, joints, and other points at which the two ceramics touch may fuse. For example, the ceramics of the first and second part may fuse to one another during sintering, thereby ensuring that the co-sintered structure appears (and in many cases, is) a unitary element with no discrete sections. Further, during sintering grains may migrate between ceramics at their common boundaries. This may create an even stronger bond, interface, and/or surface between the two ceramics (e.g., the first part and second part).

Thus, ceramic components that are co-sintered structures, as described herein, may be strong, unitary, and/or aesthetically pleasing.

Figure 1B:
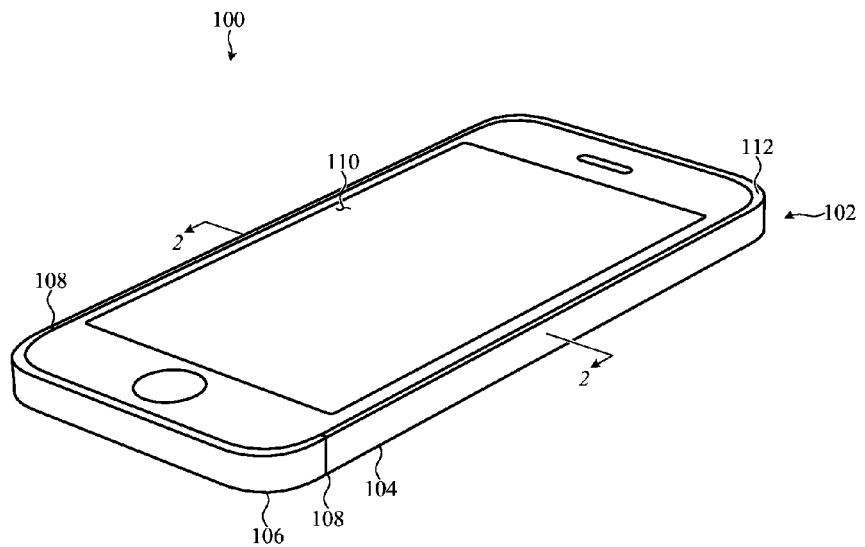
FIG. 1B depicts the sample electronic device of FIG. 1A, showing a joint within the housing.

FIGS. 1A-1B depict a sample electronic device 100, here illustrated as a mobile phone. The device 100 may include a housing 102 affixed to a cover surface 110. The housing 102 and cover surface 110 cooperate to form an exterior surface of the electronic device 100. Various components may be housed within the electronic device 100, such as a display visible through the cover surface 110. The cover surface 110 may be transparent to permit viewing such a display.

In certain embodiments and as explained in more detail herein, the cover surface 110 and housing 104 may be co-sintered to from a unified structure. The two parts may be molded together in a single mold, for example, in a two-step molding process using a common first mold piece, a second mold piece associated with the first part, and a third mold piece associated with the second part. The parts may be placed in a sintering furnace and sintered simultaneously, thereby forming a ceramic component that is a co-sintered structure. It should be appreciated that the two parts may be separately molded and joined or placed together in the sintering furnace, and then co-sintered, in some embodiments.

The housing 104 may be split into a housing 104 and end cap 106. The housing and end cap 104, 106 may meet at a joint 108, shown to best effect in FIG. 1B. Typically, the housing and end cap are attached to one another at the joint 108. It should be appreciated that the joint may be a mechanical, chemical, other bond between the upper and end cap. In some embodiments, the joint may be filled such that its surface is flush with the housing 104 and end cap 106, thereby forming a contiguous, continuous surface between housing and end cap. Although the term "end cap" is used herein, it should be appreciated that any structure of any size and/or shape may be an end cap. For example, a flat, planar structure may serve as an end cap.

The housing may define a lip 112 that extends about a cover surface 110. The lip 112 may be integral with one or both of the upper and end caps 104, 106. The lip 112 may be relatively flat and flush with the cover surface 110, or it may be proud or recessed from the cover surface. The lip is shown to better effect in the cross-sectional view of FIG. 2.

In certain embodiments, both the housing 102 and the cover surface 110 may be made of a ceramic, such as zirconia, alumina and the like. As one example, the cover surface 110 may be formed from a transparent zirconia ceramic and the housing 102 from an opaque zirconia ceramic. In other embodiments, the cover surface may be colored or tinted (at least in part) while the housing has a different color or tint. For example, one of the cover surface 110 and housing 102 may be at least partially formed from black zirconia and one may be formed from white zirconia. In other embodiments, the cover surface may be alumina and the housing may be zirconia. In some embodiments, the cover surface may be a polycrystalline alumina.

Figure 2:
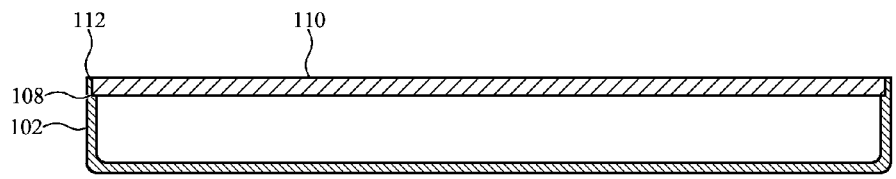
FIG. 2 is a cross-sectional view of the electronic device taken along line 2-2 of FIG. 1B with internal components removed for clarity.

FIG. 2 is a cross-sectional view taken along line 2-2 of FIG. 1A, omitting internal components of the electronic device 100 for simplicity and clarity. The lip 112 defines a step or receiving surface 200. This step receives the cover surface 110 and may act as a support for the cover surface 110 during manufacturing. In certain embodiments and as described below, cover surface 110 and housing 104 may be unitary. For example, the cover surface 110 and housing 104 (or end cap, in some embodiments) may bond together during manufacturing operations to form a single piece. In many embodiments, this single piece lacks part lines, joints, or any visible separation (other than any difference in material properties) between the two structures.

Generally, the housing 102 and cover surface 110 may be formed in a two-part molding process, followed by a sintering operation that simultaneously sinters both parts in the same sintering furnace. The process may cause the two ceramic parts (e.g., housing 104 and cover surface 110) to fuse together. Further, grains/crystalline structures from one part may effectively dope the other part, and vice versa. For example, portions of each ceramic may migrate across a border or abutting surfaces, such that the ceramic intermingle to form a strong chemical bond and a transition region between the two ceramics. The transition region may have varying concentrations of each ceramic; typically, the concentration will vary with the amount and/or thickness of each ceramic, the relative amount of each ceramic on either side of the border, and so on. Accordingly, a finished (e.g., fully sintered) structure may have crystal formation between the initial two surfaces, thereby effectively joining them as a single piece. Thus, the finished structure may be referred to as a "co-sintered" structure.

Figure 3:
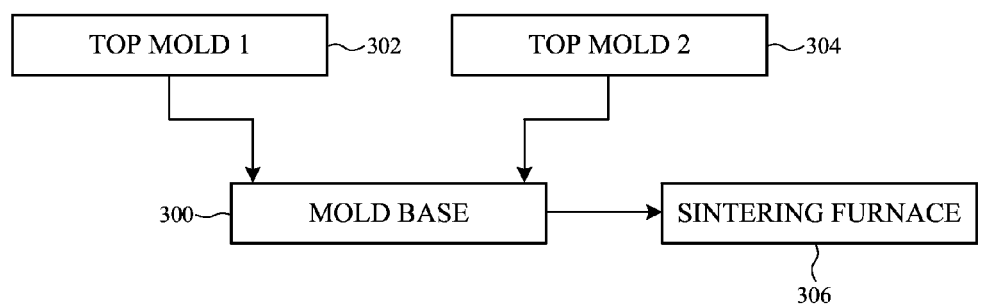
FIG. 3 is a schematic diagram of a sample system for forming a co-sintered structure.

FIG. 3 illustrates sample machinery for forming a co-sintered structure. The machinery may be used to mold multiple parts, typically in such a fashion that they are affixed to one another after molding, and then sinter the parts simultaneously. "Molding," as used herein, refers to the formation of a solid from a powder, slurry, particulate, or other suitable source. Molding encompasses the use of heat, pressure or both to form the solid. Blow molding, compression molding, and injection molding are all examples of molding. First and second parts may be injection molded, for example. In some embodiments, the first and second parts may be molded with a common, first mold piece that is joined with a second mold piece to form the first part, and a third mold piece to form the second part.

A mold base 300 may be paired with either a first top mold 302 or a second top mold 304. The mold base 300 and first top mold 302 may be used to form a first part ultimately included in a co-sintered structure, such as the housing 102. After the first part is molded, the first top mold 302 may be removed from the mold base 300 and the second top mold 304 may be placed in, or otherwise paired with, the mold base. The mold base 300 and second top mold 304 may cooperate to form a second part ultimately included in the co-sintered structure. Thus, the mold base may be the first mold piece, the first top mold the second mold piece, and the second top mold the third mold piece. It should be appreciated that a top mold may be the common (e.g., first) mold piece in certain embodiments, while different mold bases are used.

Typically, although not necessarily, the second part is formed on or adjacent the first part. For example, the first part may remain in the mold base 300 while the second part is formed thereon or adjacent thereto. In certain cases, the first part may at least partly support the second part during molding and/or sintering, or may provide a surface on which at least a portion of the second part may be molded or otherwise formed.

A sintering furnace 306 may be used to sinter the first and second parts to form the co-sintered structure. The first and second parts, once joined together during the molding operations, may be placed in the sintering furnace; heat and/or pressure may be applied to co-sintered structure. The heat and/or pressure compacts the first and second parts, forming them into a single, unified structure. Sintering the co-sintered structure, and the results thereof, are described in more detail below.

Figure 4:
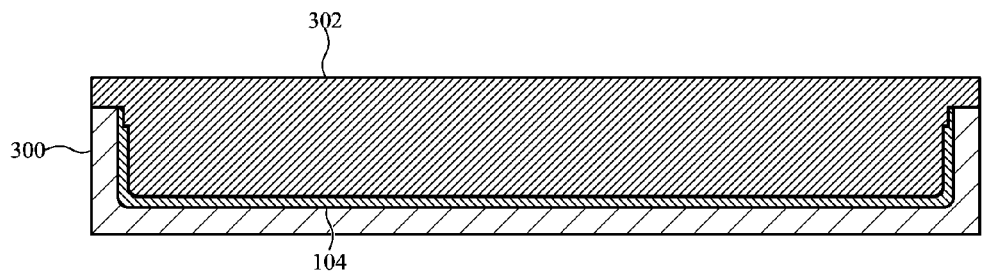
FIG. 4 is a cross-sectional view of a first part of a co-sintered structure in a mold.
Figure 5A:
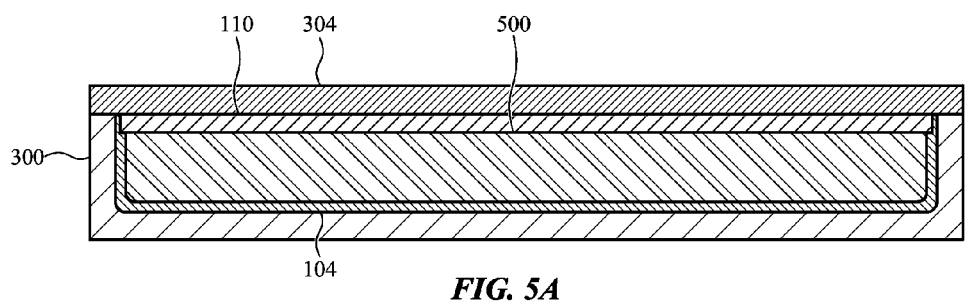
FIG. 5A is a cross-sectional view of a first and second part of a co-sintered structure in a mold.
Figure 5B:
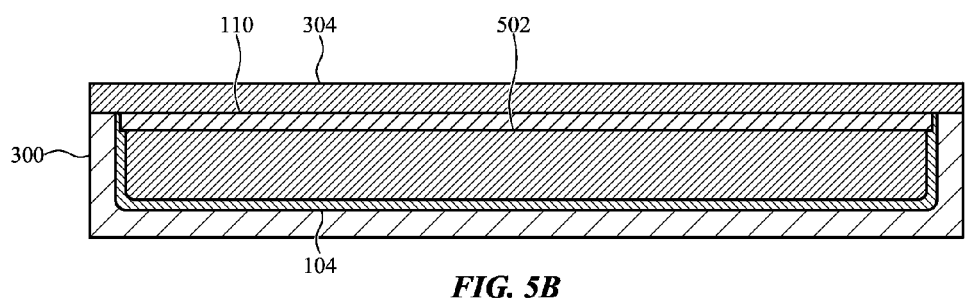
FIG. 5B is an alternative cross-sectional view of a first and second part of a co-sintered structure in a mold.

FIGS. 4-5B provide an example of forming a co-sintered structure. In particular, FIGS. 4-5B illustrate a simplified process for forming the cover surface 110 and housing 104 of FIGS. 1A-1B as a co-sintered structure. It should be appreciated that FIGS. 4-5B are cross-sectional views and are intended for illustration of one sample process and/or structure only, although embodiments and teachings herein may be broadly applied and used to form many different co-sintered structures.

Initially and with respect to FIG. 4, the first top mold 302 mates to the mold base 300. The first top mold 302 and mold base 300 define a first mold cavity therebetween. This cavity may be filled with a ceramic. For example, a first ceramic material may be injection molded in the cavity between the mold base 300 and first top mold. In some embodiments, sufficient heat and/or pressure may be applied to the first ceramic material within the cavity to set, but not fully sinter, it. In some embodiments, the first ceramic material may be partially sintered, for example to a green state. In other embodiments, the ceramic may be pressed and/or heated to form a part, but not sintered.

In the example of FIG. 4, the first ceramic material may form the housing 104.

Next and with respect to FIG. 5A, the cover surface 110 may be formed (e.g., molded). Typically, the cover surface 110 is molded on, and is supported in the mold by, the housing 104. As previously mentioned, the cover surface 110 and housing 104 (or any first and second parts that will be formed into co-sintered structure) may be formed from two different ceramics, thereby permitting different parts of the finished structure to have different physical properties. In the current example, the cover surface 110 may be transparent while the housing 104 is opaque or translucent. In other embodiments, the two parts may have different hardnesses, scratch resistances, indices of refraction, Young's moduli, and so on.

As shown in FIG. 5A, a mold insert 500 may be placed within the mold base 300 prior to forming the cover surface 110 (or other second part of a co-sintered structure). The mold insert 500 may be placed within, upon, or otherwise adjacent the housing 104 (e.g., first part). The mold insert 500 may cooperate with the housing 104 to support and form at least part of a second mold cavity for the cover surface 110 during molding. The mold insert 500 may be formed from a material that will not chemically react with the ceramics of the housing 104 and cover surface 110, so that the insert may be removed after the top surface is molded.

After the mold insert 500 is placed in the mold base 300, the second top mold 304 may be mated to the mold base 300. The second top mold 304, mold insert 500, and housing 104 may cooperate to form the second mold cavity in which the cover surface 110 may be molded. In some embodiments, the mold base 300 may also form part of this cavity.

A ceramic slurry, powder, mixture, or the like may be placed, poured or otherwise deposited into the second mold cavity. Heat and/or pressure may be applied to the mold (e.g., the combination of mold base 300 and second top mold 304) for a period of time sufficient to set the ceramic material. Generally, the ceramic materials used to form the two parts of the housing, here cover surface 110 and housing 104, may be processed in the mold until they are stable and form a solid with sufficient structural integrity to remove from the mold and undergo further processing. They need not, however, be fully sintered and/or in a final state. In some embodiments, the first and second parts may be in a green state at this phase.

After the second part (e.g., cover surface 110) is formed on, abutting or otherwise adjacent to the first part (e.g., housing 104), the second top mold 304 may be removed and the housing of the electronic device may be removed from the mold. The mold insert 500 may be removed from the housing, for example by sliding it out a free end, such as an end ultimately covered by the end cap 106 shown in FIG. 1. For example, since the end cap 106 is not formed contiguously with the housing 104 and cover surface 110, the mold insert 500 may be slid out an end of the housing that will ultimately abut the end cap at the joint 108. In other embodiments the mold insert 500 may be formed of a material that is burned out, dissolved, or otherwise removed or destroyed by post-processing after the molding operations. For example, the mold insert 500 may be burned out during a sintering process.

FIG. 5B illustrates another sample top mold 304 that may be used to unitarily form the cover surface 110 and housing 104. Here, the mold insert 500 of FIG. 5A is replaced by an integral tongue of the top mold 304. For example, the top mold may define a slot or recess that is bounded by the tongue 502 and the upper portion of the top mold 304. Essentially, the tongue moves with, and is affixed to, the rest of the second top mold 304. Thus, the tongue 502 takes the place of the mold insert 500 of FIG. 5A. The cover surface 110 may be co-molded overmolded, or the like with or to the housing 104 as described above with respect to FIG. 5A.

As may be appreciated, the two-step molding processes described herein may result in a housing or other structure that has no gaps, spaces or the like between the first and second parts. Accordingly, the first and second parts ultimately may have a higher structural integrity than if they are separately formed and then mechanically or chemically bonded. Further, this process may result in a part that does not need to undergo complex, timely and/or difficult processing to bond individual pieces together. Likewise, given the resultant integral nature of the structure, there is little or no risk of the constituent parts separating.

Returning briefly to FIG. 3, after molding the co-sintered structure and removing it from the mold base 300, the co-sintered structure may be placed in a sintering furnace 306. After molding, the first and second parts may be co-molded and thus affixed to one another, but the bond between the two parts may be primarily or fully mechanical. Co-sintering the first and second parts may create a chemical bond between the two.

Once the co-sintered structure is placed in the sintering furnace (or other sintering machine), it may be heated and/or subjected to pressure to sinter it. Simultaneously sintering the parts may form a single, co-sintered structure. Sintering of the structure may compact it, increase its mechanical strength, and form it as a final piece. Generally, the sintering process strengthens the co-sintered structure and may reduce porosity. In many applications, a ceramic material is sintered at temperatures of up to 1500° C. for up to 24 hours (or more) to form finished ceramic, such as the co-sintered structure.

Further, the sintering process may cause grains of each ceramic material to migrate between parts, essentially doping (or co-doping) each part with a portion of the ceramic from the other part. With respect to the example of FIGS. 1A and 1B, this may result in doping the cover surface 110 with a portion of the ceramic material from the housing 104, and vice versa.

This co-doping of parts may create a chemical bond between the parts that is stronger than a mechanical bond resulting from molding operations, the use of adhesives or fasteners, and the like. The resulting structure may appear to be a single piece with no visible joint or seam, due to migration of grains across the border between the first and second pieces of the co-sintered structure. Thus, processes described herein may yield a structure that has greater structural integrity, resistance to breakage, and/or improved cosmetics when compared against conventional molded structures and/or mechanically fastened structures.

Further, by sintering both the cover surface 110 and housing 104 simultaneously, shrinkage of one part with respect to another may be controlled. Both the cover surface and housing will shrink simultaneously during sintering. As a result, a finished co-sintered structure may have fewer dimensional mismatches than two separately-sintered parts that are joined together.

In addition, since the dimensions of the co-sintered structure and controlled by the mold, the need for further processing finishing and the like may be reduced or eliminated. Grinding, lapping, smoothing, polishing and the like may be less necessary, prevalent, or time-consuming for a co-sintered structure as compared to a conventional multi-piece structure.

As yet another option, first and second parts of a co-sintered structure may be formed from first and second ceramic materials, where the ceramic materials have different shrinkage rates while being sintered. The dimensions, shapes, and/or spatial relationships of the first and second parts may be controlled and/or configured such that the difference in shrinkage between the two parts, during sintering, generates a compressive stress in the finished, co-sintered structure. The compressive stress may be concentrated at thinner regions of the co-sintered structure, for example, or other relatively weak regions of the structure. By putting such regions under compressive stress, they may be mechanically strengthened.

As previously mentioned and illustrated with respect to FIG. 2, the lip 112 may be any shape and/or size and need not extend entirely around a perimeter of the cover surface 110, or extend from an entirety of the housing 104. The stepped portion of the lip 112 may be hidden from view by the cover surface in the finished, co-sintered structure. Further, the lip may provide greater surface area at an abutment or otherwise between the housing 104 and cover surface 110. This, in turn, may increase the surface area over which fusing, ceramic grain exchange, co-doping and/or other effects of co-sintering occur within the co-sintered structure. The lip 112 and/or part of the sidewalls of the housing 104 thus may be materially and chemically bonded to corresponding parts of the cover surface 110 in the co-sintered structure.

Although the mold and sintering furnace have been described as separate elements, they may be combined in certain embodiments. In such embodiments, the co-sintered structure may remain in the mold base 300. Yet another top mold may be used to close the mold, or no top mold may be used depending on the embodiment. The first and second parts may be sintered in the mold.

In embodiments where the mold and the sintering furnace are a single assembly, risk of damaging the first and second parts while moving them from the mold to the sintering furnace may be reduced. Since the first and second parts are co-molded but not yet sintered, they may be relatively delicate and so combining the mold and furnace may reduce breakage, rework and/or other types of failure.

Figure 6:
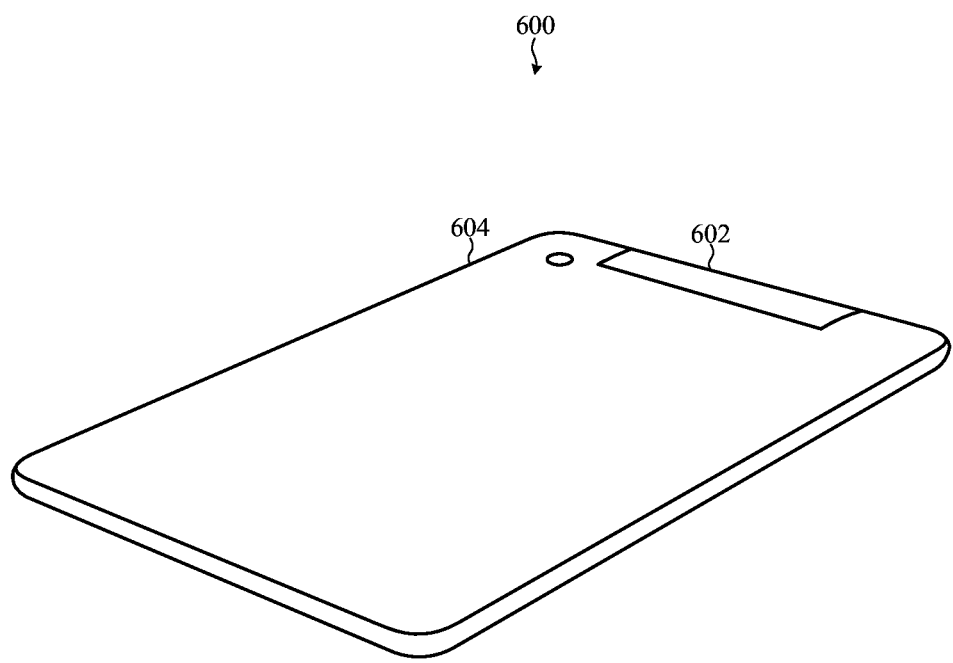
FIG. 6 illustrates another sample co-sintered structure.

FIG. 6 illustrates another sample co-sintered structure 600. Here, a housing base 604 of a tablet computing device may be formed as a co-sintered structure. The first ceramic part may be a rear or base 604 of the tablet housing 600. The second ceramic part may be an antenna window 602 or other portion of the housing 600 that may have different structural, optical, or other physical requirements than the housing base 604. For example, a camera window may be formed as the second ceramic part in certain embodiments.

Any suitable structure may be formed as a co-sintered structure. Electronic device housings are but one example. Jewelry, input devices, timekeeping devices, and so on may all be formed as co-sintered structures.

With respect to the example of FIGS. 1A and 1B, the co-sintered structure formed from housing 104 and cover surface 110 may be part of, or even a majority of, an exterior of an electronic device. The co-sintered structure may be open at one end, thereby permitting electronic components and the like to be inserted into an interior of the structure. The end cap 106 may be mechanically, chemically, or otherwise affixed to the co-sintered structure to complete and seal the exterior. For example, the end cap may be affixed beneath a portion of the cover surface 110 and to the housing 104 at the joint 108. It should be appreciated that the location and orientation of the joint 108 is but one example; the joint may extend at different angles and/or be located at different positions in various embodiments. As one non-limiting example, the joint 108 may extend parallel to the cover surface 110 and the end cap 106 may form a base (or part of a base) of the electronic device while the housing 104 forms sidewalls (and, optionally, at least part of the base.

Figure 7:
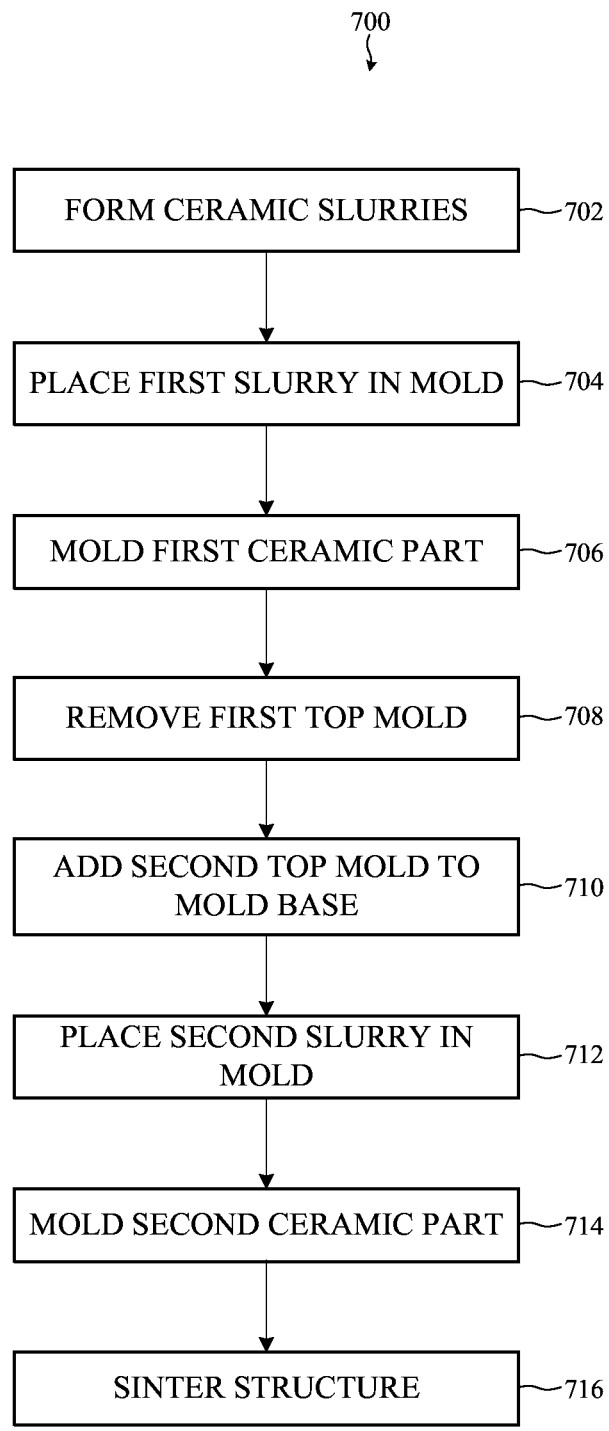
FIG. 7 is a flowchart detailing a sample method for creating a co-sintered structure.

FIG. 7 is a flow chart illustrating one embodiment for making a co-sintered structure for a portable electronic device by molding, such as injection molding or cast molding. Generally, various operations of the method of FIG. 7 correspond to the manufacturing operations discussed herein with respect to FIGS. 3-5A.

In operation 700, any or all of solvent, water and ceramic, which may be zirconia, alumina, a combination thereof or any other suitable material, is mixed to form a first and second slurry. The first and second slurries may include different ceramics, concentrations of ceramics, combinations of ceramics, and so forth. For example, a first ceramic used to form a first slurry may be zirconia and a second ceramic used to form a second slurry may be alumina. Further, the ceramics used to form the first and second slurries may be powdered, chopped, fibers, or any other suitable form.

The first slurry may be poured into a casting mold (e.g., a mold base 300 and first top mold 302) at operation 702. At operation 704, the material is pressed and/or heated (e.g., molded) to form a first ceramic part. At operation 706, the mold is separated and a portion of the mold, which may in one embodiment be a top portion of the mold, is removed. The first ceramic part remains in the mold.

At operation 708, a second top mold portion 304 is mated with the mold base 300 to form a second void at least partially adjacent the first ceramic part. At operation 710, the second ceramic-containing slurry, which may be the same or different from the first slurry, introduced into the second void and thus abutting and/or adjacent the first ceramic part. In operation 712, the second ceramic-containing slurry and first ceramic part are subjected to hear and/or pressure to mold a second ceramic part on and/or abutting the first ceramic part.

Following operation 712, in operation 714 both the first ceramic material and the second ceramic material are heated at a high temperature and/or subjected to pressure to fully sinter the ceramics together. This may result in grains of each ceramic migrating between the parts as previously described, or otherwise causing the ceramics of the two parts to each dope the other. The resulting co-sintered ceramic structure includes both ceramics and forms a unified structure.

It should also be appreciated that first and second parts of a co-sintered structure may be used to form decorations, logos, differently-colored areas, and so forth. Further, some embodiments may use more than two parts to form a co-sintered structure. The size, shape, and dimensions of the various parts of the co-sintered structure may vary from example to example.

Different types of molding may be used to form a co-sintered part. For example, in some embodiments gel casting may be used instead of injection molding. Likewise, process parameters for molding and/or sintering operations may vary depending on the co-sintered structure being formed, the ceramic(s) being used, end uses of the structure, and so on. Additionally, more than two parts may be formed and used to create a co-sintered structure.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method for manufacturing a ceramic housing for a portable electronic device, comprising:
   forming a first part from a first ceramic material that is optically opaque to define a partially enclosed volume and an opening into the partially enclosed volume;
   forming a second part from a second ceramic material that is optically transparent;
   positioning the second part over the opening of the first part; and
   sintering the first part and the second part, thereby fusing the first part to the second part to form the ceramic housing.

2. The method of claim 1, wherein:
   forming the first part from the first ceramic material comprises molding the first part from the first ceramic material; and
   forming the second part from the second ceramic material comprises molding the second part from the second ceramic material, such that the second part abuts the first part.

3. The method of claim 1, wherein simultaneously sintering the first part and second part comprises co-sintering the first part and second part in a sintering furnace.

4. The method of claim 3, wherein co-sintering the first part and second part causes first ceramic grains of the first ceramic material to migrate to the second part.

5. The method of claim 3, wherein co-sintering the first part and second part causes the second ceramic material to dope the first part.

6. The method of claim 1, wherein fusing the first part to the second part bonds the first and second parts without a visible seam.

7. The method of claim 1, further comprising joining the ceramic housing to an end cap to form an exterior of an electronic device.

8. The method of claim 1, wherein the first ceramic material and the second ceramic material include different structural properties.

9. A housing for a portable electronic device, comprising:
   a first part formed from a first ceramic material that is opaque and defines an opening; and
   a second part formed from a second ceramic material that is transparent and is positioned at least partially within the opening of the first part; wherein
   the first and second parts are fused together during sintering.

10. The housing of claim 9, wherein:
    the portable electronic device comprises an optical component; and
    the second part defines a window for the optical component.

11. The housing of claim 9, wherein:
    the first ceramic material is zirconia; and
    the second ceramic material is alumina.

12. The housing of claim 10, wherein:
    the optical component is a display; and
    the second part defines a cover for the display.

13. The housing of claim 9, further comprising an end cap affixed to the first and the second part.

14. The housing of claim 9, wherein:
    the first and second parts cooperate to form a continuous external surface of the housing.

15. The housing of claim 9, wherein the first part defines a support for the second part.

16. A method for forming a co-sintered structure, comprising:
    molding, using first mold piece and a second mold piece, a first part from a first ceramic slurry;
    co-molding to the first part, using the first mold piece and a third mold piece, a second part from a second ceramic slurry; and
    co-sintering the first and second parts, thereby forming the co-sintered structure, the first part being optically opaque and the second part being optically transparent and positioned at least partially within an opening defined within the first part.

17. The method of claim 16, further comprising supporting at least some of the second ceramic slurry with the first part.

18. The method of claim 16, wherein:
    the first ceramic slurry is a zirconia slurry; and
    the second ceramic slurry is an alumina slurry.

19. The method of claim 16, further comprising, prior to co-molding, depositing the second ceramic slurry in a mold cavity defined by the third mold piece and first part.

20. The method of claim 16, wherein co-sintering the first and second parts shrinks the first and second parts.

21. The method of claim 20, further comprising controlling shrinkage of the first and second parts during the co-sintering operation.

* * * * *